Patented Apr. 1, 1952

2,591,604

UNITED STATES PATENT OFFICE 2,591,604

PREPARATION OF NAPHTHALENE-METHYLOL ESTERS

Richard A. Reck, Chicago, Ill., assignor to Armour and Company, Chicago, Ill., a corporation of Illinois No Drawing. Application April 3, 1948, Serial No. 18,860

8 Claims. (Cl. 260—410.5)

This invention relates to the preparation of high molecular weight fatty acid esters of condensed aromatic nuclear hydrocarbon methanols. The esters are high-boiling, low-melting compounds, soluble in a wide range of solvents, for example, alcohols, hydrocarbons, esters and chlorinated solvents, and have properties that make them useful as plasticizers, etc.

Esters of the above type have not heretofore been produced, and one reason therefor is that the methanols are unstable and attempts to esterify them directly would lead to numerous by-products caused by self-condensations.

I have found that the high molecular weight fatty acid esters of condensed aromatic nuclear hydrocarbon methanols, as described herein, may be prepared by a transesterification reaction. In general, transesterification may be exemplified as follows:

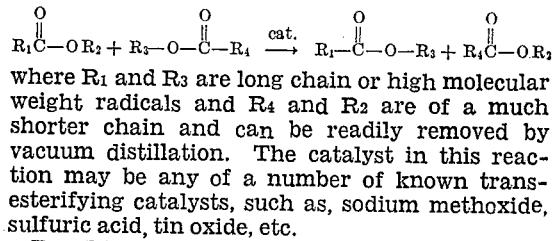

where $R_1$ and $R_3$ are long chain or high molecular weight radicals and $R_4$ and $R_2$ are of a much shorter chain and can be readily removed by vacuum distillation. The catalyst in this reaction may be any of a number of known transesterifying catalysts, such as, sodium methoxide, sulfuric acid, tin oxide, etc.

By "high molecular weight fatty acids," as used herein, I mean fatty acids having from 6 to 30 carbon atoms in the hydrocarbon radical. Excellent results are obtained when the hydrocarbon radical has from 6 to 20 carbon atoms. Esters which appear to be particularly useful as plasticizers are formed by using fatty acids having from 12 to 20 carbon atoms in the hydrocarbon radical. The fatty acids may be used separately or in combination and may be used in the proportions in which they are found in natural products, such as linseed oil, soybean oil, fish oil, lard, etc. Usually good results have been obtained through the use of oleic acid.

In the preparation of fatty acid esters of aromatic methanol derivatives, an equation demonstrating the reaction may be set out as follows:

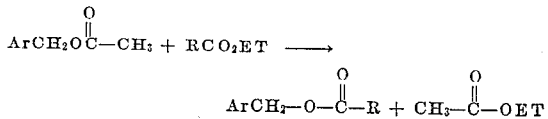

R may be any fatty group of 6 to 30 carbon atoms, saturated or unsaturated. Ar is an aromatic group, such as benzene, naphthalene, anthracene, etc.

In the production of fatty acid esters of condensed aromatic nuclear hydrocarbon methanols, the condensed aromatic nuclear hydrocarbons are of a class of which naphthalene, phenanthrene and anthracene are example. Unusually good results have been obtained by employing napthalene as the starting condensed aromatic hydrocarbon but others of the class above may be used satisfactorily.

Specific examples may be set out as follows:

Example I

Equimolecular quantities of ethyl laurate, napthalenemethylol acetate and 1% by weight of sodium methoxide are heated under .5 mm. vacuum at 50° C. for one hour. The vapors are trapped in a Dry Ice-ethanol bath and a theoretical quantity of ethyl acetate is collected. The reaction mixture is allowed to cool and is washed until free of the sodium methoxide. The resulting material is distilled with the fraction boiling over at 180° C. at .5 mm. taken as naphthalene methylol laurate. Saponification values bear this out.

Example II

A mixture of 40 g. of α-naphthylmethylacetate, 60 g. of methyl oleate and 1 g. of sodium methoxide was placed under diminished pressure. The volatile methyl acetate was collected in a Dry Ice-ethanol cooled trap and in 2 hours 17 cc. was obtained. This is practically the theoretical amount. The residue was washed with water and distilled. A few grams of unreacted material was removed first with the bulk of the product distilling at 230–240° C. at 0.5 mm. 80 grams of α-naphthylmethyloleate was obtained. It is a light colored yellow liquid.

Example III 45 g. of ethyl laurate, 40 g. of α-naphthylmethylacetate and .8 g. of sodium methoxide were treated as in Example II. 65 g. of α-naphthylmethyl laurate was obtained as a light yellow liquid boiling at 202–210° C. at .5 mm.

Example IV 62 g. of ethyl stearate, 40 g. of α-naphthylmethylacetate and 1 g. of sodium methoxide were treated as in Example II. The product was a white solid melting at 42° C. and distilling at 230–240° C. at .5 mm. The yield was 85%.

Example V 156 g. of the ethyl esters from tallow fatty acids (stearic and oleic), 101 g. of α-naphthylmethylacetate, and 2.5 g. sodium methoxide were treated in the usual manner. It took 4 hours to remove the theoretical amount of ethyl acetate; 45 cc. The product was stripped of low-boiling materials by heating up to 200° C. at .5 mm. The residue was subjected to a short path distillation with 195 g. of α-naphthylmethyltallate being recovered as a light yellow liquid.

Another example is the production of α-naphthylmethylstearate. α-naphthylmethylacetate, ethyl stearate and sodium methoxide are heated under diminished pressure until the evolution of ethyl acetate ceases. The residue contains the α-naphthylmethylstearate. It may be purified by washing and vacuum distillation. The α-naphthylmethylacetate is prepared by a known method from α-naphthylmethylchloride, which is prepared, in turn, from napthalene, formaldehyde and hydrogen chloride.

While, in the foregoing description, I have set forth specific examples in considerable detail for the purpose of illustrating the invention, it will be understood that the details of the processes and steps given may be varied widely by those skilled in the art without departing from the spirit of my invention.

I claim:

1. Fatty acid esters of polynuclear condensed aromatic methanols in which the only linkage between the aromatic nucleus and substituents on the aromatic nucleus are carbon to carbon bonds and in which the acyl radical has from 12 to 30 carbon atoms.

2. Fatty acid esters of polynuclear condensed aromatic methanols in which the only linkage between the aromatic nucleus and substituents on the aromatic nucleus are carbon to carbon bonds and in which the acyl radical has from 12 to 20 carbon atoms.

3. Fatty acid esters of naphthalene methanol in which the only linkage between the aromatic nucleus and substituents on the aromatic nucleus are carbon to carbon bonds and in which the acyl radical has from 12 to 30 carbon atoms.

4. Saturated fatty acid esters of polynuclear condensed aromatic methanols in which the only linkage between the aromatic nucleus and substituents on the aromatic nucleus are carbon to carbon bonds and in which the acyl radical has from 12 to 30 carbon atoms.

5. Unsaturated fatty acid esters of polynuclear condensed aromatic methanols in which the only linkage between the aromatic nucleus and substituents on the aromatic nucleus are carbon to carbon bonds and in which the acyl radical has from 12 to 30 carbon atoms.

6. α-Naphthylmethyloleate.

7. α-Naphthylmethyl laurate.

8. α-Naphthylmethylstearate.

RICHARD A. RECK.

REFERENCES CITED

The following references are of record in the file of this patent:

UNITED STATES PATENTS

| Number | Name | Date |
| --- | --- | --- |
| 2,260,556 | Bruson | Oct. 28, 1941 |
| 2,282,557 | Bruson | May 12, 1942 |